United States Patent
Börner et al.

[11] 3,800,388
[45] Apr. 2, 1974

[54] APPARATUS FOR ALIGNING TWO OPTICAL COMPONENTS

[75] Inventors: Manfred Börner; Joachim Guttmann; Werner Löffler, all of Ulm, Donau; Dietmar Gruchmann, Ulm, Bofingen, all of Germany

[73] Assignee: Licentia Patent-Verwaltungs G.m.b.H., Frankfurt am Main, Germany

[22] Filed: Nov. 30, 1972

[21] Appl. No.: 310,782

[30] Foreign Application Priority Data
Nov. 30, 1971 Germany............................ 2159327

[52] U.S. Cl............................... 29/200 P, 29/203 P
[51] Int. Cl............................................ B23p 19/00
[58] Field of Search........... 29/200 P, 203 P, 203 R, 29/200 B

[56] References Cited
UNITED STATES PATENTS
3,454,330  7/1969  Smith.................................. 350/287
3,455,625  7/1969  Brumley et al. ...................... 350/96

*Primary Examiner*—Thomas H. Eager
*Attorney, Agent, or Firm*—Spencer & Kaye

[57] ABSTRACT

Apparatus for aligning two optical components along a common optical axis includes two holders each holding a respective one of the optical components at a fixed distance from the axis of rotation of the respective holder. The distance $d$ between the axes of the two holders has a value such that $$|r_1 - r_2| \leq d \leq |r_1 + r_2|$$

where $r_1$ and $r_2$ are the distances between each of the optical components and the axis of rotation of its respective holder. The holders are rotated with respect to each other until the optical components become optically aligned.

16 Claims, 6 Drawing Figures

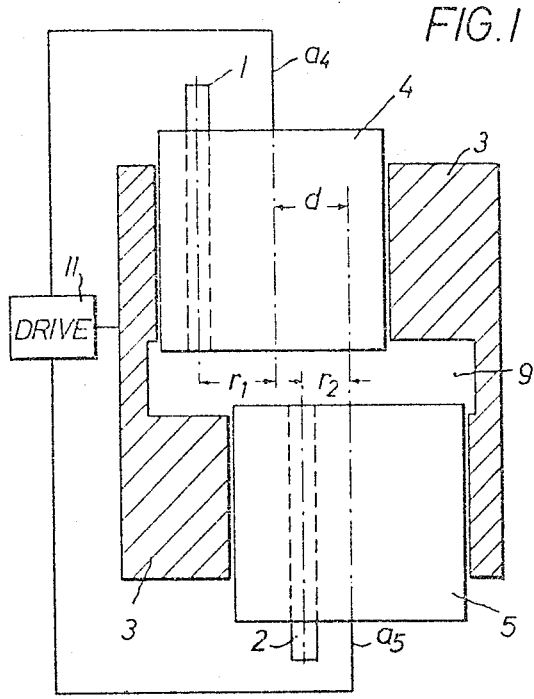
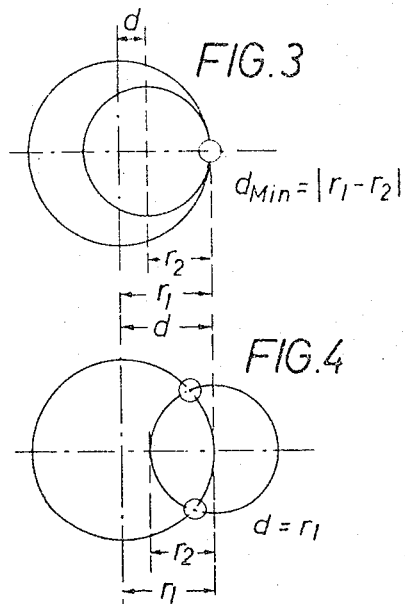
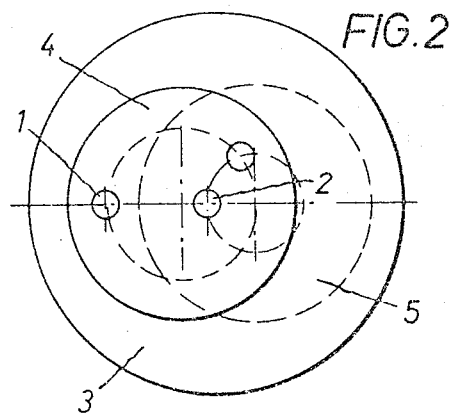
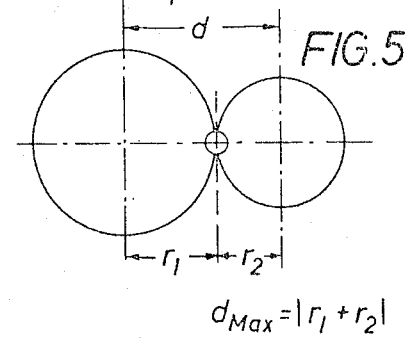
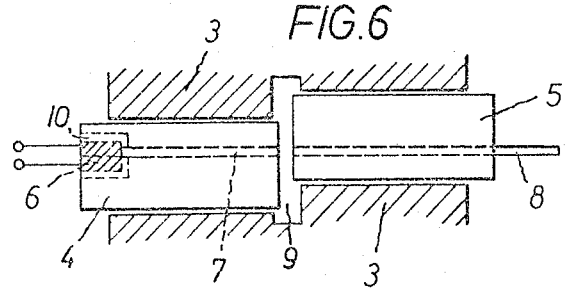

APPARATUS FOR ALIGNING TWO OPTICAL COMPONENTS

BACKGROUND OF THE INVENTION

The present invention relates to an apparatus for aligning two optical components on a common optical axis.

The coupling of light energy into optical components in which only a small number of modes can be propagated, for example light conductive fibers, is known to produce several problems since the effective entrance or exit opening for light rays is extremely small in such fibers.

It has been proposed to carry out the coupling of optical components with the aid of lens arrangements. However, this type of arrangement produces mismatching of modes which leads to transmission losses. It has also been proposed to couple the optical components by means of a hologram or an optical resonator, but these additional coupling elements would greatly increase the total cost of the coupling arrangement. The effective entrance or exit opening of light-conducting fibers can be enlarged, according to a further proposal, by a change in the value of the index of refraction in the light-conductive fiber in the area of the coupling point but the need for precise alignment of the fibers to be coupled is also unavoidable with this method.

SUMMARY OF THE INVENTION

An object of the present invention is to provide an apparatus for aligning two optical components along a common optical axis in a simple and dependable manner.

Another object of the invention is to provide apparatus for aligning optical components which can be installed in data transmission systems as an inexpensively manufactured coupling member.

These objectives are accomplished according to the present invention in that the optical components are rotatably arranged at fixed spacings ($r_1$, $r_2$) from spatially offset axes of rotation, ($a_4$, $a_5$), separated by a fixed distance d whose value lies within the following limits $|r_1 - r_2| \leq d \leq |r_1 + r_2|$. A drive mechanism rotates the components with respect to each other until they become optically aligned. Once the components are aligned, means are provided for permanently setting the optical components in this optimally aligned position.

The advantages of the apparatus according to the present invention are that the alignment of the two optical components along a common optical axis can be realized with a very high degree of accuracy in a relatively short time.

BRIEF DESCRIPTION OF THE DRAWINGS

FIG. 1 is a longitudinal view, partly in cross section, of apparatus for aligning the optical components in accordance with the invention.

FIG. 2 is a top schematic view illustrating the operation of the apparatus of FIG. 1.

FIGS. 3–5 schematically illustrate the respective locations at which the optical components would be aligned for different distances d between the spatially offset axes.

FIG. 6 is a side view of a modification of the embodiment of FIG. 1.

DESCRIPTION OF THE PREFERRED EMBODIMENTS

FIG. 1 shows an apparatus for aligning two optical components 1, 2. The apparatus includes a housing 3 which preferably has a cylindrical form. Bores are formed within the housing 3; these bores are radially offset with respect to one another and are located on oppositely disposed sides of the housing. Guide pins, or cylinders, 4 and 5 are inserted into these bores and are freely movable at least about their axes of rotation $a_4$ and $a_5$ during the alignment process. Optical components 1 and 2 are located within the guide pins 4 and 5, respectively. Rotation of guide pins 4 and 5 therefore causes movement of the optical components 1 and 2 along respective circles having the radii $r_1$ and $r_2$ about axes $a_4$ and $a_5$, respectively, as shown in FIG. 2. The axes $a_4$ and $a_5$ must be spaced from one another by a distance, d, which has a value within the limits determined by the limiting condition $|r_1 - r_2| \leq d \leq |r_1 + r_2|$.

FIGS. 3 to 5 clearly show the positions in which coincidence of the optical components 1 and 2 is possible for three different arrangements, i.e. an alignment along a common optical axis. FIG. 3 represents the case of $d_{Min}$, the minimum distance which the two axes $a_4$ and $a_5$ may have from one another and in FIG. 5 $d_{Max}$ is the maximum distance. The positions for a situation where d lies between these extremes (for example $d = r_1$) are shown in FIG. 4.

The alignment may be effected by driver 11 which either rotates both guide pins 4 and 5 with respect to each other in a stationary housing 3 or rotates the housing about the axis of rotation $a_4$ or $a_5$ of one guide pin which pin remains stationary, while also rotating the other guide pin about its axis so that again both guide pins effectively rotate with respect to each other. In the latter case it is advantageous for the housing to rotate rapidly and to simultaneously slowly rotate the other guide pin about its respective axis. For example in the case of a stationary housing 3 the one guide pin may be rotated with about one turn in ten seconds while the other guide pin may be rotated with 20 turns in one second. That is a ratio of rotation rates of 1 to 200.

To complete the alignment process, the optical components must be firmly secured in place once they are optically aligned. This can be done by mechanical pressure, for example, in such a way that the housing is temporarily heated by a heating device during the alignment process. Once the alignment is completed, the heating device is removed and the housing shrinks as it cools so that the two guide pins become tightly clamped. In addition to such a shrink fitting other methods, such as soldering, welding, clamping or gluing, for example, could be used for fastening the guide pins in the housing.

Optical components as referred to in accordance with the invention would include all such components which have a small entrance or exit opening through which light rays can pass. This would include optical diodes, such as laser diodes and photodiodes, and light conductive fibers, i.e. all components which can advantageously be used in optical data transmission systems. The alignment apparatus according to the present invention can also be simultaneously used as a coupling member in optical transmission systems where it would have the particular advantages that it would provide a connection that could be released at any time and that the coupling member could be reused whenever desired.

If an optical component has a very small diameter, for example about 100 μ, it is difficult to form a bore with a corresponding inner diameter in the guide pin for holding this component. This difficulty can be overcome, however, by providing a bore with a larger diameter in the guide pin and fastening the optical component, for example a light-conductive fiber, within the bore by means of an adhesive applied at least in the vicinity of the end piece of the fiber which is to be coupled. Another possibility is to insert the fiber into a capillary tube and to adjust the bore in the guide pin to the outer diameter of this capillary.

It is advisable to adapt the optical components which are to be coupled together so that they both have the same effective apertures at their respective intersecting faces. The need for such an adaptation would occur for example where a laser diode or photodiode is to be coupled to a light-conductive fiber. In FIG. 6, an illustration of this adaptation is provided. Diode 6, located in opening 10, is initially optically coupled to a light-conductive fiber 7 within its guide pin and this fiber is then coupled with the aid of the alignment apparatus of the present invention to another light-conductive fiber 8 which is to be used in order to be able to transmit the light energy over a greater distance. In order to reduce coupling losses, the value of index of refraction of the light-conductive fibers may be modified in the area of the coupling ends of the fibers. Thermal treatment is one example of a process for accomplishing this modification of the index of refraction. This type of modification produces an effective entrance or exit opening for the light rays in the fiber ends, the opening being larger than the cross section of the totally reflecting core in the remainder of the fiber. A further improvement of the degree of coupling efficiency can be obtained if the area 9 lying between the optical components to be coupled is filled with a reflection reducing substance, preferably an immersion oil.

The alignment of the two optical components can be controlled in a simple manner in that a light beam is fed into one of the two components in the alignment apparatus and then is transferred to the other component and the light intensity being received at the opposite end of the other component is measured. When the received light intensity is at a maximum, the components are optimally in alignment.

In an optical data transmission system such a measurement can be made, for example in that the light energy is obtained from another amplifier station which follows in a distance of about 1 kilometer.

The intensity of the light signal is measured and the measured magnitude is then returned via a normal electrical cable to the alignment apparatus of the first amplifier station and is there compared with the energy of the impinging light beam.

It is also possible, however, to make the light-conductive fibers transparent by a reversible curvature and the light emerging therefrom is measured, for example, directly behind the alignment apparatus and then compared as before with the energy of the light beam impinging on the other side of the alignment apparatus. In this procedure it is made use of the fact that light is only then guided by the core of a light-conductive fiber if the bending radius of the fiber is not too small.

If, for example, the bending radius is below a value in the order of about 1 millimeter light is not guided any more along the curvature and emerges from the fiber. As before said this light emerging from the fiber is measured to reach the optimal alignment of the two components connected by the alignment apparatus.

The light-conductive fibers used in a communication system have a diameter of about $60 \times 10^{-6}$m and a core diameter of about $3 \times 10^{-6}$m. The guide pins have a diameter of about 3 mm and a length of 10 to 15 mm.

It will be understood that the above description of the present invention is susceptible to various modifications, changes and adaptations, and the same are intended to be comprehended within the meaning and range of equivalents of the appended claims.

We claim:

1. Apparatus for aligning two optical components along a common optical axis, comprising in combination: two holder means, each arranged for rotation about a respective axis and for holding a respective optical component at a respective fixed distance from its associated axis, said axes being spaced from each other by a distance d of a value such that $$|r_1 - r_2| \leq d \leq |r_1 + r_2|$$

where $r_1$ and $r_2$ are the respective distances by which the optical components are spaced from said axes; and drive means connected to said holder means for rotating said holder means with respect to each other to a position where the optical components become optically aligned.

2. Apparatus as defined in claim 1 wherein each of said holder means is composed of a cylindrical guide pin arranged along said respective axis and having a guide bore extending through said guide pin and centered at said respective fixed distance from said respective axis.

3. Apparatus as defined in claim 2 wherein each of said guide pins has two end faces along said axis and an opening in at least one of said faces at the end of said bore.

4. Apparatus as defined in claim 2 further comprising a housing means holding said two guide pins with their axes parallel, said housing means being provided with two longitudinal housing bores, each of said housing bores extending from an opposite one of the two ends of said housing and the center axis of each being mutually offset from the other by said distance d, and each of said guide pins being rotatably positioned in a respective one of said housing bores so as to be able to rotate about said respective axis.

5. Apparatus as defined in claim 4 further comprising means for controlling the movement of said holder means whereby after the optical components have been aligned they are firmly secured against further movement.

6. Apparatus as defined in claim 5 wherein said movement controlling means includes means for heating said housing whereby said holder means can then be freely rotated and means for cooling said housing whereby said holder means is then prevented from being rotated.

7. Apparatus as defined in claim 4 wherein said drive means rotates one of said holder means about its respective one of said axes and said housing about the other one of said axes.

8. Apparatus as defined in claim 2 further comprising a capillary tube positioned within one of said guide bores of a respective one of said guide pins and a light-conductive fiber as one optical component and being positioned within said capillary tube.

9. Apparatus as defined in claim 2 further comprising: an optical diode as one optical component and being positioned within an outer end of one of said guide bores of a respective one of said guide pins and a light conductive fiber positioned in the same one of said guide bores as said optical diode and being optically coupled to said optical diode.

10. Apparatus as defined in claim 1 further comprising a laser diode as one optical component.

11. Apparatus as defined in claim 1 further comprising a photodiode as one optical component.

12. Apparatus as defined in claim 1 further comprising a light-conductive fiber as at least one optical component.

13. Apparatus as defined in claim 12 wherein an end portion of said light-conductive fiber has an index of refraction which is different from the index of refraction of the remainder of said fiber so that the boundary surface of said end portion through which the light beam passes is effectively increased with respect to the remainder of said fiber.

14. Apparatus as defined in claim 1 further comprising two optical components each having ends axially spaced from each other, thus defining a spatial area and a reflection reducing material placed within said spatial area.

15. An optical transmission system comprising the apparatus as defined in claim 1.

16. A method for aligning two optical components along a common optical axis, comprising the steps of: positioning each of two optical components within a respective holder at a fixed distance from a respective axis of the holder; separating the axes of the holders from each other by a distance d having a value such that $$|r_1 - r_2| \leq d \leq |r_1 + r_2|$$

where $r_1$ and $r_2$ are the respective distances by which the optical components are spaced from the axes; and rotating each of said holders about its respective axis so that the optical components become optically aligned.

* * * * *